May 6, 1958  N. B. WALES, JR  2,833,143
APPARATUS FOR DETECTING LAND MINES
Filed April 25, 1955  2 Sheets-Sheet 1
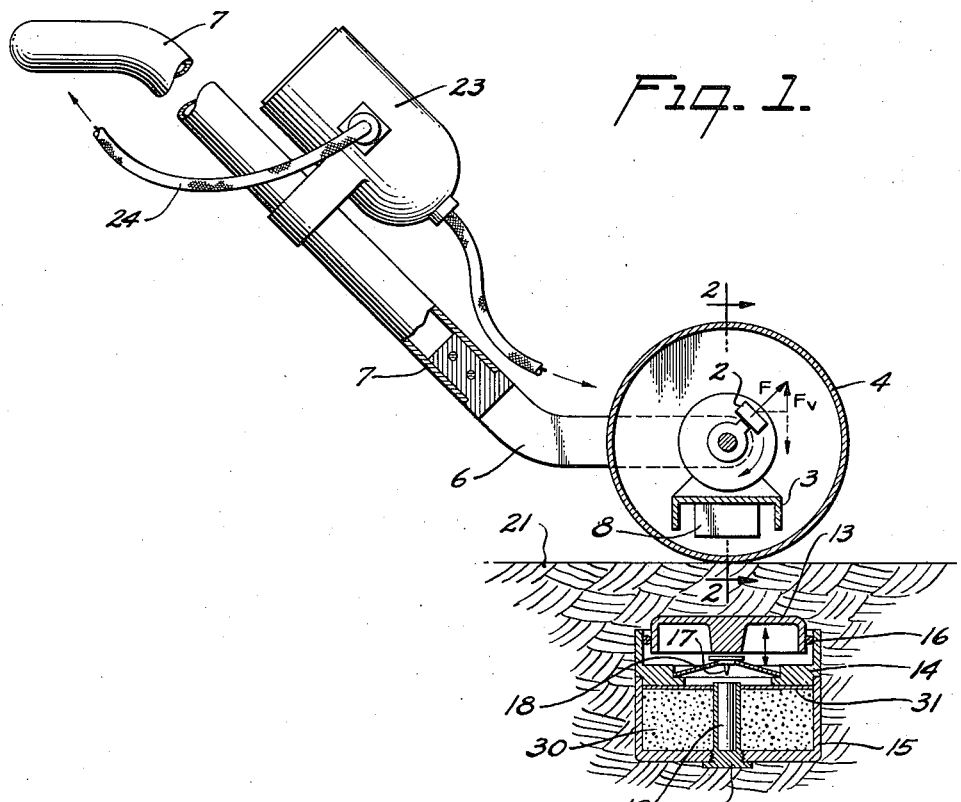
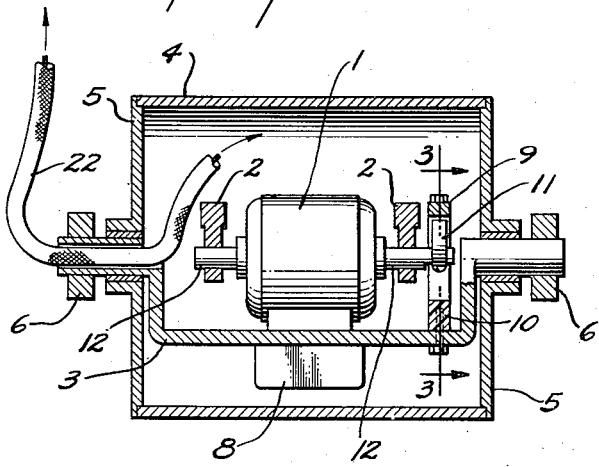
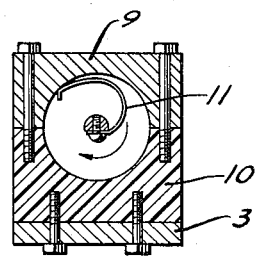
INVENTOR.
NATHANIEL B. WALES JR.
BY
George V. Hall
ATTORNEY.

May 6, 1958     N. B. WALES, JR     2,833,143
APPARATUS FOR DETECTING LAND MINES
Filed April 25, 1955     2 Sheets-Sheet 2

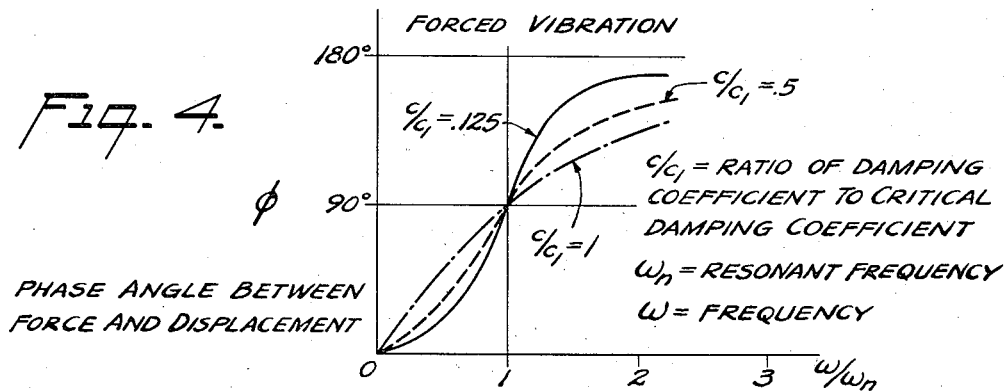

Fig. 4.

PHASE ANGLE BETWEEN FORCE AND DISPLACEMENT $c/c_1$ = RATIO OF DAMPING COEFFICIENT TO CRITICAL DAMPING COEFFICIENT
$\omega_n$ = RESONANT FREQUENCY
$\omega$ = FREQUENCY

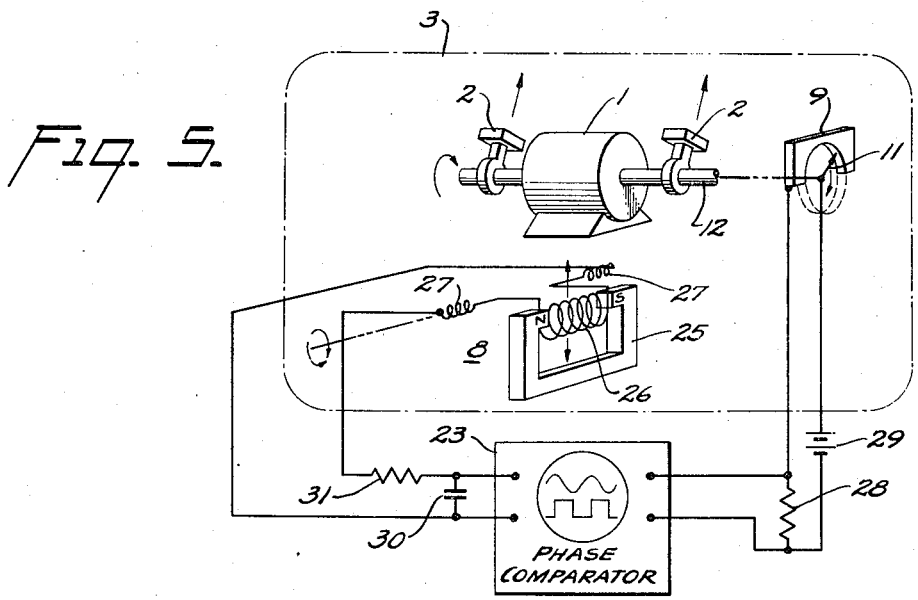

Fig. 5.

(a) INPUT A
(b) A CLIPPED
(c) INPUT B
(d) B CLIPPED
(e) $A_C - B_C$

Fig. 6.

AVERAGE VOLTAGE PROPORTIONAL TO PHASE DIFFERENCE

INVENTOR.
NATHANIEL B. WALES JR.
BY
George V. Hall
ATTORNEY.

2,833,143
Patented May 6, 1958

2,833,143
APPARATUS FOR DETECTING LAND MINES

Nathaniel B. Wales, Jr., New York, N. Y., assignor to Monroe Calculating Machine Company, Orange, N. J., a corporation of Delaware Application April 25, 1955, Serial No. 503,433

4 Claims. (Cl. 73—67.1)

This invention relates to apparatus for detecting the presence and location of explosive land mines by measuring the dynamic relations between the displacement of the surface of the earth and an applied force causing this displacement. The operation of my device consists first in applying a vibratory force to the surface of the earth in which a land mine may be buried, and second of measuring the difference in time phase between the motion of the surface of the earth and the said applied vibratory force. The phase of this motion may be measured with reference either to displacement, velocity, or acceleration.

The basis of my invention lies in the fact that the great majority of ordnance land mines, whether metallic or non-metallic in construction, depend on the use of a spring supported platform to discriminate between the presence or absence of the initiating target. My invention is designed to detect the presence of such spring supported platforms by noting the phase relationship between a vibratory force applied to the earth, which may or may not contain such a spring platform, and the displacement which results from this vibration.

If there is such a spring mine platform underneath the exploratory vibration, there will be a distinct change of phase observed as the vibratory device encounters the mine, due to the radically different resiliencies of earth and a spring mine platform. It may be seen that such a mine detector will not respond to rocks or other inert objects which do not have the spring characteristics of any conventional mine.

In the terminology of electromechanical analogues, the subject method may be considered to comprise a measurement of the motional impedance of the ground in order to detect the characteristic leading phase of a spring under forced vibration.

The preferred form of apparatus disclosed to accomplish the foregoing method consists of a motor driven unbalanced weight secured to the axis of a roller, together with an electromechanical vibration transducer. The motor shaft is provided with a switching commutator to signal the position of the unbalanced weight and the outputs of both the commutator and vibration transducer are impressed on a phase comparator which may be either in the form of a cathode ray oscilloscope displaying the two wave forms simultaneously, or in the form of a meter which displays the average current produced in a load resistor on which the difference of the clipped impressed input potentials is impressed.

An object of my invention is to provide an apparatus for mine detection which will respond to the presence of metallic or non-metallic mines while discriminating against rocks or other discontinuities in the earth.

A second object is to provide an apparatus for detection which is non-destructive of the mine.

A third object is to make possible a design of mine detector which is portable, rugged, and reliable in operation.

A fourth object is to make available an apparatus for the measurement of the mechanical impedance of materials or mechanical transmission lines.

Other objects are implicit in the specifications and claims.

In the drawings:

Figure 1 is the partial section in side elevation of an embodiment of my invention;

Figure 2 is the section 2—2 of Figure 1;

Figure 3 is the section 3—3 of Figure 2;

Figure 4 is a graph showing the variation of the phase difference between force and displacement of a forced vibration, with frequency, for various coefficients of damping;

Figure 5 is a schematic diagram showing the cooperative connection between the elements of the device illustrated in Figure 1; and Figure 6 is a wave form diagram of the operation of an alternative phase comparator to that shown in Figure 5.

In the drawings, numeral 1 represents a motor which may be electric or an internal combustion engine. Motor 1 is provided with a double ended shaft 12 on which are mounted the two symmetrical unbalanced weights 2. Also secured to shaft 12 is the wiping brush leaf 11 which in rotation alternately contacts the metallic commutator member 9 and the insulating support member 10 to which commutator 9 is secured, thereby comprising a square wave generator or contactor having a fixed phase relationship to the rotating unbalance weights 2. Both motor 1 and commutator 9 are mounted on frame 3 which also comprises the journal for drum 4 with the cooperation of end plates 5. An electromechanical transducer 8 is also secured to frame 3, and electrical access to motor 1, commutator 9 and transducer 8 is provided by means of cable 22 which emanates from these elements within the drum or roller 4 via a hollow journal integral with frame 3.

A fork 6 is secured to the journal portions of frame 3 outside the roller 4 and this fork 6 is in turn secured to a tubular handle 7 so as to permit the manual movement of the mine detecting roller 4 over the terrain 21 to be explored.

Cable 22 connects with a phase comparator unit 23 which is clamped to handle 7, while cable 24 connects the comparator unit 23 to a suitable electric power supply such as a "back-pack" type of battery excited power supply familiar to those skilled in the art.

In Figure 1, a typical mine structure is disclosed. This comprises platform 13 slidably mounted in upper mine body 14 so as to form a piston having a rubber sealing ring 16. Supported on body 14 and compressed therebetween by piston platform 13 is a spring member 18 of the annular type known as a "Bellville" spring. Spring 18 is provided with a central firing pin 17 secured thereto and arranged so that on the exertion of sufficient predetermined force on piston 13 relative to the case 14, spring 18 will deflect past its equilibrium position and move downward rapidly to pierce and fire the detonator 19. Lower mine case 15 contains an explosive annulus 30 which surrounds the detonator 19 and its holder 20. Closure disk 31 separates the explosive from the upper body cavity. The disarming and safety devices common in such mines have been omitted for simplicity.

Referring to Figure 5, the vibrator 1, vibrator phase indicator 9, and vibration pickup transducer 8 are shown secured to a common reference frame 3. The particular form of transducer 8 shown comprises a moveable coil 26 which is suspended in the field of permanent magnet 25 by the opposing torsion springs 27. Due to the inertia of coil 26 it tends to remain at rest so that any motion of frame 3 having a vertical component will produce a relative motion between coil 26 and magnet 25 which is secured to frame 3. The voltage appearing across coil 26 is thus a measure of the instantaneous velocity of the frame 3 and in turn is a measure of the movement of the earth (21) on which it rests. The integrating network consisting of capacitor 30 and resistance 31 thus yields a voltage wave form which corresponds to the displacement time curve of the frame's motion.

The commutator 9 serves to generate a square wave voltage across load resistor 28 by switching battery 29 on and off. This square wave will have a fixed phase relation to the angular position of the weights 2, and consequently to the instantaneous force vector F. It is clear that a potentiometer or generator or similar transducer can be used to indicate the force phase equally well. Also, it is evident to those skilled in the art that many other types of vibrator such as piezoelectric, magnetostriction or reciprocating solenoid might be substituted for the motor 1 and weights 2 within the scope of my invention.

The phase comparator 23 may consist of a cathode ray display tube together with an electronic switch to give a simultaneous presentation of the two wave forms impressed on it by the transducer 8 and the force phase indicator 9. Alternatively, a two gun oscilloscope may be used to give simultaneous display for phase comparison.

The operation of the device illustrated in Figures 1, 2, 3 and 5 is as follows:

With the motor 1, running, a vibratory force is transmitted through roller 4 to the ground 21. Depending on the dissipative character of this ground there will be a phase relation between the instantaneous vertical component of force as signalled by the commutator 9, and the instantaneous displacement of the roller 4 into or away from the earth as registered by the voltage across capacitor 30 which in general will be such that the displacement lags behind the force. However, when the operator pushes the roller 4 by handle 7 so that the roller lies above a resilient mine platform such as piston 13, a change of phase will show on the phase comparator since the spring characteristic of the spring 18 will cause the phase of the displacement voltage to advance over the previous reading. This positive phase change is the desired signal that a mine has been detected.

In one experimental equipment, the frequency of vibration was approximately 60 cycles per second, the mass of the roller and motor assembly approximately 10 pounds, and the unbalance approximately ½ inch ounce. Under these conditions, a 60° phase shift was observed over the indication in moist sand when the roller passed over a 2½ inch diameter antipersonnel plastic land mine buried ½ inch under the surface of the sand. This mine is adjusted to fire on about 20 pounds applied static force, but due to the oscillatory nature of the exploratory vibration no amplitude of displacement in spring 18 capable of actuating the mine can take place even though the instantaneous force was several times the static actuating limit of the mine.

Figure 6 illustrates the operation of an alternative phase comparator well known to the art and which may be used as an alternative to the oscilloscopic comparator shown in Figure 5. In this device the two wave forms (which must be the same frequency) are clipped to a uniform amplitude so that the only parameter which defines the length of pulse is the instant of passage of the given wave form through the zero axis.

If these two clipped wave forms as shown in Figure 6(b) and Figure 6(d) are subtractively combined as in Figure 6(e), a pulse area will be developed which is proportional to the phase difference of the impressed wave forms. An integrating network and a milliammeter can then be used to read the average voltage, which may then be used as a direct phase difference indicator for mounting in the indicator housing 23 of Figure 1.

The generalized mathematical relation between phase difference and frequency for any forced mechanical vibration is shown graphically in Figure 4 for several degrees of damping. From this, it may be seen that it is desirable to operate my device at a frequency lower than the natural mechanical resonance frequency of the system including the mine and vibrator in order to obtain the maximum rate of change of phase over a wide range of damping coefficients.

The operation of my invention thus consists in the following steps:

(1) The imposition on the earth of an oscillatory vertical component of force.

(2) The measurement of the phase of this force with respect to time.

(3) The measurement of the phase of the displacement of the earth responsive to the said oscillatory force, and, (4) The comparison of the two said measured phases.

What I claim is:

1. In a device for detecting mines of the type which are located in the earth, the combination comprising a spindle, a frame, motor means to drive said spindle in rotation relative to said frame, a mass secured to said spindle, the center of gravity of said mass being non-coincident with said spindle, a coupling member in contact with the earth and secured to said frame whereby vibrations generated by said rotating mass are imparted from said frame to the earth, signal means to produce a first cyclic electrical signal in fixed phase relation with the rotation of said mass relative to said frame, a vibration sensitive transducer secured to said frame for generating a second cyclic electrical signal in fixed phase relation with a translational motion of said frame, and means for indicating a change in the relative phase between said first and second signals.

2. A device according to claim 1 in which said coupling member comprises a rolling member journalled with respect to said frame.

3. In a device for detecting mines of the type which are located in the earth, the combination comprising a frame, means for vibrating said frame, signal means to produce a first cyclic electrical signal in fixed phase relation with said means for vibrating said frame, a coupling member in contact with the earth and secured to said frame whereby vibrations of said frame are imparted to the earth, a vibration sensitive transducer secured to said frame for generating a second cyclic electrical signal in fixed phase relation to a translational motion of said frame, and means for indicating a change in the relative phase between said first and second signals.

4. A device according to claim 3 in which said coupling member comprises a rolling member journalled with respect to said frame.

References Cited in the file of this patent

UNITED STATES PATENTS

| | | |
|---|---|---|
| 2,355,826 | Sharpe | Aug. 15, 1944 |
| 2,412,240 | Williams et al. | Dec. 10, 1946 |
| 2,489,564 | Du Toit | Nov. 29, 1949 |